United States Patent
Kumar et al.

(10) Patent No.: US 9,272,933 B2
(45) Date of Patent: Mar. 1, 2016

(54) BIO-AUGMENTATION COMPOSITION AND USE THEREOF FOR IMPROVING EFFICIENCY OF EFFLUENT TREATMENT IN HYDROCARBON PROCESSING PLANT

(75) Inventors: Manoj Kumar, Faridabad (IN); Mahendra Pratap Singh, Faridabad (IN); Ashok Kumar Tiwari, Faridabad (IN); Deepak Kumar Tuli, Faridabad (IN); Ravinder Kumar Malhotra, Faridabad (IN); Anand Kumar, Faridabad (IN)

(73) Assignee: INDIAN OIL CORPORATION LTD., Kolkata (IN)

( * ) Notice: Subject to any disclaimer, the term of this patent is extended or adjusted under 35 U.S.C. 154(b) by 182 days.

(21) Appl. No.: 14/009,784

(22) PCT Filed: Apr. 2, 2012

(86) PCT No.: PCT/IN2012/000235
§ 371 (c)(1),
(2), (4) Date: Nov. 14, 2013

(87) PCT Pub. No.: WO2012/137220
PCT Pub. Date: Oct. 11, 2012

(65) Prior Publication Data
US 2014/0144838 A1    May 29, 2014

(30) Foreign Application Priority Data
Apr. 4, 2011  (IN) .............................. 474KOL/2011

(51) Int. Cl.
C02F 3/34     (2006.01)
C02F 101/10   (2006.01)
C02F 101/20   (2006.01)
C02F 101/32   (2006.01)
C02F 101/34   (2006.01)
C02F 103/36   (2006.01)

(52) U.S. Cl.
CPC ................. *C02F 3/341* (2013.01); *C02F 3/344* (2013.01); *C02F 2101/101* (2013.01); *C02F 2101/20* (2013.01); *C02F 2101/32* (2013.01); *C02F 2101/345* (2013.01); *C02F 2103/365* (2013.01)

(58) Field of Classification Search
USPC ......................................................... 435/248
See application file for complete search history.

(56) References Cited

U.S. PATENT DOCUMENTS 4,093,539 A    6/1978  Guarino
5,705,072 A    1/1998  Haase
6,251,657 B1   6/2001  Hunter et al.

(Continued)

FOREIGN PATENT DOCUMENTS

GB    2 360 787 A       10/2011
WO    2004/094316 A1    11/2004
WO    2007/093993 A2    8/2007

*Primary Examiner* — Chester Barry
(74) *Attorney, Agent, or Firm* — Maschoff Brennan (57) ABSTRACT

The present invention provides a bio-augmentation composition for improving the hydrocarbon degradation efficiency of effluent treatment plant for hydrocarbon degradation in wastewater generated from hydrocarbon processing industry and a method thereof. The composition comprises a synergistic combination of selective microorganisms to develop a consortium enabling effective degradation of hydrocarbons present in wastewater and converting thereof into harmless and environment friendly substances. The invention also provides for the said microorganisms and their isolations.

19 Claims, 1 Drawing Sheet

(56) References Cited

U.S. PATENT DOCUMENTS

| | | |
|---|---|---|
| 6,383,797 B1 * | 5/2002 | Lee .......................... 435/252.4 |
| 6,653,120 B1 * | 11/2003 | Leonhardt .................... 435/266 |
| 6,818,211 B2 | 11/2004 | Tisinger et al. |
| 7,344,643 B2 | 3/2008 | Elefritz |
| 7,547,394 B2 | 6/2009 | Cote |
| 7,560,027 B2 | 7/2009 | Yamaguchi et al. |
| 2004/0200773 A1 | 10/2004 | Gibbs et al. |
| 2005/0106702 A1 | 5/2005 | Brigmon et al. |
| 2006/0163154 A1 | 7/2006 | Tay et al. |
| 2008/0047896 A1 | 2/2008 | Johnson et al. |
| 2008/0308493 A1 | 12/2008 | Amir et al. |

\* cited by examiner understand# BIO-AUGMENTATION COMPOSITION AND USE THEREOF FOR IMPROVING EFFICIENCY OF EFFLUENT TREATMENT IN HYDROCARBON PROCESSING PLANT

FIELD OF THE INVENTION

The present invention relates in general to effluent treatment of wastewater. In particular it relates to a bio-augmentation composition for improving efficiency in effluent treatment for reduction of hydrocarbon content in wastewater generated from hydrocarbon processing industry. It further relates to a method of improving efficiency of treatment of waste water for reduction of hydrocarbons therein. The invention also relates to use of selective microorganisms as a microbial consortium in the composition for the purpose and their isolation.

BACKGROUND OF THE INVENTION AND PRIOR ART

Basic wastewater treatment facilities reduce organic and suspended solids to limit pollution to the environment, however often they are not up to the satisfactory level. Lack of efficient waste water treatment may cause serious environmental damages and hence it is still a major concern for various industries. Depending on the type of industry and the nature of its wastes, industries have been utilizing various methods to purify wastewater containing pollutants such as heavy metals and toxic chemicals before it can be discharged. In many parts of the world serious health problems and diseases have often been caused by discharging untreated or inadequately treated wastewater. Such discharges or water pollutants result in the spreading of disease and may cause destruction of other forms of aquatic life.

Petroleum processing industries use large quantity of water during various processing operations and produce large quantity of water contaminated with hydrocarbons, phenols, heavy metals and sulphides in varying amounts depending on the production processes. Besides that, accidental spillage of petroleum also causes contamination of water bodies. These pollutants, if left untreated can cause serious ill effects to the environment and human beings. Apart from that, if the water is to be re-used, it should be treated for removal of pollutants. The wastewater in a typical petroleum processing industry is treated in Effluent Treatment Plant (ETP) by various physico-chemical methods in which the economically recoverable products like hydrocarbons are recovered and the rest pollutants are degraded by mainly microbial action.

At present, wastewater treatment plants commonly utilize one or more processes for the treatment of wastewater. The most widely used wastewater treatment process is that of "primary treatment" which relies on plain sedimentation of settleable wastewater solids for Biochemical Oxygen Demand (BOD) and suspended solids removal. The efficiency of the primary process is in the 25-30% range. However, the results of primary treatment can be improved by the use of chemicals to enhance the settleability of wastewater solids.

In addition to the primary treatment process, there is a number of "secondary treatment" processes employed. These processes improve water quality by employing the growth of biological masses, which utilize the pollutants in the water for nutrients in their metabolic life cycles. The subsequent removal of the biological masses from the wastewater results in an effluent of an improved quality.

The "trickling filter" treatment is one secondary technique widely used in the treatment of wastewater. The filter is a packed bed of media, which provides a surface upon which a film of biological slime can grow and over which the wastewater is passed. The oxygen and organic matter in the wastewater diffuse into the film where the oxidation and synthesis of additional growth can occur. Plants using the trickling filter method can effect a carbonaceous BOD removal of 60 to 90 percent, depending mainly on the loading rate of the facility. In addition, the trickling filter process can effect an oxidation of the ammonia present in the wastewater, which is desirable.

The other and probably most widely used secondary treatment for wastewater is the "activated sludge" process. The activated sludge process can be defined as a process in which flocculated biological growths are continuously circulated and contacted with organic wastewater in the presence of oxygen. The oxygen is usually supplied by bubbling air into the sludge-liquid mixture in an aeration tank. This air can be introduced through air diffusers to develop a hydraulic motion of the contents of the aeration tank. A typical hydraulic motion involves a "spiral roll" of the contents of the aeration tank. The aeration step is usually followed by a solid-liquid separation from which a portion of the biologically active sludge is separated and recycled back to the aeration tank to provide an active source of bacterial growth to continue treatment. The activated sludge process under optimum conditions can be up to 90% effective in the removal of carbonaceous BOD. However, the "activated sludge" process is not without disadvantages as it can be readily upset by surges in the volume of wastewater and other circumstances which may prevent the attainment of the designed goals.

Microbial degradation appears to be the most environment friendly approach of oil removal as these microbes transform the pollutants to $CO_2$ and water. Typically, the biological treatment of the wastewater is carried out in the biological treatment section by the activated sludge process. In activated sludge process wastewater containing organic matter is aerated in an aeration basin in which micro-organisms metabolize the suspended and soluble organic matter. Part of organic matter is synthesized into new cells and part is oxidized to $CO_2$ and water to derive energy. In activated sludge systems the new cells formed in the reaction are removed from the liquid stream in the form of a flocculent sludge in settling tanks. A part of this settled biomass, described as activated sludge is returned to the aeration tank and the remaining forms waste or excess sludge. The efficiency of microbes in activated sludge process depends upon the concentration of pollutants, presence of heavy metals, availability of carbon source, temperature, pH and process conditions like mixing regime, loading rate, and the hydraulic flow rate. Gram-negative heterotrophic bacteria mainly of Pseudomonas type constitute the majority of microorganisms present in activated sludge.

The biological treatment of industrial wastewaters by activated sludge process is, however, often disrupted by shock load from organic (e.g., chlorinated organics, phenolic compounds, surfactants, and herbicides) and inorganic (e.g., heavy metals, sulfides, and ammonia) chemicals present in the wastewater stream. This disruption of biological processes results in decreased carbon removal and modification of sludge compaction properties. Little is known about the composition of mixed microbial communities in reactors when biological processes are disrupted by or recovering from. Besides that, day by day, the statutory requirement for limit of hydrocarbons in effluent discharge is being decreased by statutory bodies. For example, in India the limit has been reduced from 10 ppm to 5 ppm for oil and grease (O&G)

content effective by 2009. This also calls for the invention which can be used to meet the requirement by no change in the existing ETP configuration, which is a very cost intensive affair.

Petroleum refineries produce wastewater from their various processes. This water is treated in the ETPs. Bioremediation, using activated sludge is one option for the treatment of such wastes. Biological units (trickling filter and aeration chambers) reduce the O&G content by catabolic capacities of microbes. The extent of degradation depends on presence of required catabolic gene pool as well as in their numbers. ETPs are usually unable to completely degrade the wastewater being treated in the biological unit (the aerator chambers). By providing the desired catabolic potential in adequate numbers, the overall efficiency of the treatment system can be improved by bio-augmentation and/or bio-stimulation. Bio-augmentation of activated sludge systems with specialised bacterial strains could be a powerful tool to improve several aspects in wastewater treatment processes, such as improved degradation of recalcitrant compounds.

Bioremediation strategies rely on the catabolic capacities of microbes to transform harmful pollutants into harmless compounds. Wastewater generated from the petroleum industry finds its way into soil and water bodies causing pollution problems of increasing magnitude. Despite decades of research, successful bioremediation of petroleum wastes still remains a problem. Treatment of this wastewater in ETPs is carried out by microbial biomass in the activated sludge of the ETP. The efficiency of the microbial population depends on various factors, such as the concentration of pollutants, their availability as a carbon source, temperature, pH, etc. Due to adverse stress conditions, the ETP does not run at its maximum efficiency and the treated wastewater still contains high Chemical Oxygen Demand (COD) levels. Sometimes, the required gene pool for further degradation may not be present or its titer value could be too low for sustained expression. In such cases, methods like nutrient addition (bio-stimulation) or the addition of laboratory grown bacteria that have the desired degradation capacity (bio-augmentation) could be followed. The effects of bio-stimulation on total petroleum hydrocarbons have been extensively investigated in controlled conditions and in open field experiments under optimal conditions. It is reported that nutrient supplementation may speed up the process of bioremediation, since the addition of large quantities of oil results in a high C:N ratio which is unfavorable to microbial activity. In cases where natural communities of degrading bacteria are present in low numbers or even absent, bio-augmentation, i.e., the addition of contaminant-degrading organisms can speed up the degradation process. The main advantage of bio-augmentation is the addition of a different gene pool that complements the existing one and helps in further degradation of pollutants.

Bio-augmentation, the addition of bacterial products that increases the biological activity in the system and addition of optimized nutrients could be beneficial to enhance the degradation efficiency. This helps to reduce the contaminants in faster manner. Bio-augmentation products can be either liquid or dry. Because of ease of handling, liquid products are generally preferred and can be added by a liquid metering pump drawing on a container that is replenished on a periodic basis. However, dry formulations are preferred for other applications such as waste treatment facilities. Strains used in bio-augmentation of hydrocarbons should have efficient hydrocarbon degrading ability to produce hydrocarbon solubilizing surface active agents and should have tolerance/ detoxification methodology for heavy metals like vanadium, nickel and chromium etc. Since, the activated sludge operates in ambient conditions, changing seasons, particularly in tropic countries like India, where all extremes of three seasons i.e., winter, summer, rainy seasons are observed, the bio-augmentation formulation should have ability to grow and effectively remove toxicants. Bio-augmentation product should also have the ability to stabilize in aeration tank and multiply in appropriate numbers. The growth of the added microbes should also not be inhibited by already present in activated sludge and vice versa. When Gram-negative microorganisms are used for bio-augmentation, they are present as vegetative cells and as such they may be killed by chemicals, such as surfactants, heavy metals which often remain present in the wastewater. The spore forming Gram-positive bacteria are more resistant to the toxic substances.

Accordingly, there is a need to develop bio-augmentation formulations that can effectively and efficiently degrade oil and grease and which should have environment-tolerant features to work in seasonal variations. There is a further need for increasing tolerance level of the microbial consortium which can detoxify/tolerate heavy metals present in the wastewater and the process should work without any change in the existing ETP configuration.

U.S. Pat. No. 4,093,539 discloses a method for operating an activated sludge wastewater treatment plant, which utilizes rotating contactors that are partially submerged in the wastewater in the aeration tank of the activated sludge plant. The rotating contactors provide a fixed film media for the growth of biological life that is present in the recycled activated sludge in the aeration tank. The result is a more active biological coating on the fixed film media than is found on such media when used as a separate secondary treatment. In the preferred embodiment, the energy to rotate the contactors is supplied by the same compressed gas that is normally introduced below the surface of the wastewater in the aeration tank of the conventional activated sludge system U.S. Pat. No. 5,705,072 discloses a process for bio-treatment of effluent from waste gas scrubbing systems of hydrocarbon processing facilities and for the biotreatment of sulfide and ammonia containing wastewater streams from other sources. Sulfides are minimized by bacteria cultures, particularly Thiobacillus. COD, TKN and BOD are concurrently minimized by co-cultures of the bacteria with various heterotrophs. In a version of the process, the co-cultures of the bacteria with various heterotrophs are also capable of performing nitrification, without application of nitrifiers. Acclimation of the heterotrophs to the species to be removed is accomplished by biological acclimation and enrichment reactors which reduce mycell toxicity to the heterotrophs. To control pH of the heterotrophic reaction with sulfides, magnesium oxide (MgO) and caustic are used separately or in combination. With adequate removal of the COD, TKN and BOD, nitrification and removal of ammonia can be accomplished by nitrifying bacteria cultures, particularly nitrosomonas and nitrobacters. Enrichment of the nitrosomonas and nitrobacters is accomplished by using a biological enrichment reactor. To control pH and provide a carbon source for the nitrosomonas and nitrobacters, a combination of magnesium oxide and sodium bicarbonate is utilized.

U.S. Pat. No. 6,818,211 discloses a Gram-positive microorganism, *Bacillus megaterium* that effectively and efficiently degrades fatty acids. A composition comprising said microorganism and a method for degrading fatty acids and grease are also disclosed. Availability of glycerol to the biodegrading microorganism was discovered to enhance biodegradation.

U.S. Pat. No. 6,251,657 discloses an apparatus and method for anaerobic biodegradation, bioremediation or bioprocessing of hydrocarbon dissolved in aqueous matrix, such as wastewater, ground water, or slurry and dissolved alkanes, aromatic hydrocarbons and/or halogenated hydrocarbons that are metabolized or co-metabolized by denitrifying bacteria.

U.S. Pat. No. 7,560,027 discloses a method and an apparatus for treating organic wastewater and sludge which remarkably reduce the generated amount of sludge at a much lower running cost, and which reduce the size and the capacity of the solubilization tank. The method and apparatus for treating the sludge employs a biological treatment system, wherein a biological treatment of wastewater is carried out, and a solid-liquid separation unit for separating a solid from a liquid in the wastewater after the biological treatment gives a treated wastewater and a sludge. The apparatus has a means for obtaining a withdrawn sludge from a part of the sludge and an alkali-treatment tank, wherein an alkali-treatment of the withdrawn sludge is carried out. The apparatus also has a biological solubilization tank which solubilizes the sludge after the alkali-treatment under an anaerobic, anoxic or microaerophilic condition, and a means for recycling the solubilized sludge to the biological treatment system.

U.S. Pat. No. 6,653,120 discloses generally biodegrading volatile organic compounds found in refinery liquid waste streams and, in particular, a process and apparatus for removing volatile organic compounds from refinery liquid waste streams. Volatile organic compound content of liquid refinery waste stream is reduced by using aqueous solutions containing microbes.

U.S. Pat. No. 7,547,394 teaches about a wastewater treatment system using aerobic granules which has a large number of sequencing batch reactor tanks with high volumetric exchange rate, a variable cycle length and constant batch volume. The batch reactors are operated for C, N removal and P is removed chemically, optionally under BioP enhanced conditions. SS are removed in a downstream separation step.

U.S. Pat. No. 7,344,643 discloses a process which utilizes an activated sludge tank, a solid-liquid separator, and a bioreactor to significantly reduce, or eliminate, waste activated sludge (WAS) within a sludge stream. A sidestream reactor is employed downstream from the bioreactor to remove soluble phosphates left in the sludge stream by the low WAS process. Within the sidestream reactor, a source of multivalent metal ions is added to a slightly alkaline sludge stream to precipitate the phosphates. The solid phosphates have a specific gravity higher than that of the organic matter in the sludge stream and may be separated from the sludge stream based upon differential settling velocity.

Burgess et al. 2000 (J E Burgess, J Quarmby and T Stephenson Vitamin addition: an option for sustainable activated sludge process effluent quality; Journal of Industrial Microbiology & Biotechnology (2000) 24, 267-274) describe the process wherein performance and metabolic rates of samples of activated sludge dosed with vitamin supplements have been compared. After initial screening, four vitamins and two metals as single supplements and in pairs were dosed continuously into the mixed liquor of an activated sludge simulation. Toxicity, oxygen demand removal, respiration rates and suspended solids were measured to monitor the effect on process efficiency. It was confirmed experimentally that an industrial wastewater stream did not contain a sufficient supply of micronutrients for efficient biological treatment. This was concluded from the observation that control sludge batches (receiving no supplements) averaged chemical oxygen demand removal efficiency of 58%. Dosing micronutrients into the mixed liquor produced removal efficiencies of up to 69%. Some of the supplements increased the respiration rate of the sludge while some decreased it, indicating a range of stimulatory and inhibitory effects. Complex interactions between micronutrients that were dosed simultaneously were evident. Several positive effects led to the conclusion that micronutrients have the potential to optimise process performance of activated sludge plants treating industrial wastewater. The addition of phosphorus/niacin and molybdenum/lactoflavin removed wastewater components that were toxic to nitrifiers as indicated through toxicity testing, thus protecting downstream nitrification/denitrification treatment processes.

Pala and Sponnza 1996 (A. I. Pala; D. T. Sponza Biological Treatment of Petrochemical Wastewaters by *Pseudomonas* Sp. Added Activated Sludge Culture. Environmental Technology, Volume 17, Issue 7 July 1996, pages 673-685) isolated a *Pseudomonas* sp. from the activated sludge of a petrochemical industry treatment plant and used as an inoculum culture for biological treatment of petrochemical wastewaters. The objective was the comparison of biological treatment efficiencies between *Pseudomonas* sp. added activated sludge and normal activated sludge taken from the full scale treatment plant. Experiments were carried out both in batch and continuous operations using a laboratory scale activated sludge system. Monod kinetic was used to determine kinetic coefficients from the experimental data of continuous operations. The maximum COD utilization rate constant (k), saturation constant ($K_s$), microbial decay rate ($k_d$), yield coefficient (Y) and maximum specific growth rate ($\mu_{max}$) were determined to be 0.95 1/day, 199 mgCOD/L, 0.10 1/day, 0.30 mgMLSS/mgCOD and 0.285 1/day for normal activated sludge, respectively. These coefficients were also determined for *Pseudomonas* sp. added activated sludge system as 2.75 1/day, 1035 mgCOD/L, 0.08 1/day, 0.32 mgMLSS/mgCOD and 0.88 1/day, respectively. Removal efficiencies of COD, TN and phenol for lower sludge ages were found higher for the *Pseudomonas* sp. added activated sludge system than that of the activated sludge system. Treatment efficiencies were found to be almost the same for both systems at high sludge ages.

US Application US2008308493 discloses a system and method for treating wastewater by continuously flowing wastewater into a chemostat and continuously discharging clean water out of the chemostat. The system can include sensors and an electronic controller for online measuring ambient parameters in the chemostat and adjusting the chemostat's operating conditions accordingly.

PCT Application WO2007093993 discloses to the field of hydrocarbon degradation, and more particularly, to environmentally safe bacterial compositions useful for cleaning and treating hydrocarbon-contaminated water and surfaces. The compositions have utility in degrading hydrocarbons, including petroleum, in seawater and on surfaces. The invention provides a novel bacterial isolate belonging to the Idiomarina genus (strain no. ASH1), having a 16S rRNA sequence; a novel bacterial isolate belonging to the Rhodobacteriacea genus (strain no. ASH4), having a 16S rRNA sequence; a novel bacterial isolate belonging to the Alter Omonas genus (strain no. OKI), having a 16S rRNA sequence; and a novel bacterial isolate belonging to the Alcanivorax genus (strain no ASH4), having a 16S rRNA sequence. Each of the isolates was found to be effective in degrading hydrocarbons in seawater.

PCT Application WO2004094316 relates to a petroleum-degrading bacteria using uric acid as a nitrogen source. The bacteria belong to the *Alcanivorax* and *Acinetobacter* genera.

US Application US20050106702 describes methods for the microbial degradation of petroleum pollutants including polyaromatic hydrocarbons (PAHs) using bacterial isolates from an oil refinery field.

Hedlund et al., disclose the isolation of a novel genus and species of marine bacterium that degrade polycyclic aromatic hydrocarbons, Neptunamonas naphthovorans (Appl. Environ. Microb., 65(1):251, 1999).

US Application US20040200773 relates to a highly efficient, microbial generator, bio-reactor or bio-generator that optimizes the bio-augmentation of wastewater streams, wastewater bodies, ground-waters and other aqueous discharges by generating and dispensing active, non-dormant microbes at the point or site of bio-augmentation in sufficient quantities, types, and rates that overcomes the inadequacies and cost prohibitions of prior available methods.

US Application US20060163154 discloses a method for processing environmental samples to remove or otherwise reduce the level of certain chemical species. In a preferred embodiment, the invention contemplates a process for reducing the level of inorganic and/or organic chemical species in wastewater or other aqueous or semi-aqueous environments or other waste environments. The invention further provides compositions of bacteria useful in modulating the redox potential of an environment to generate redox mediator species which facilitate the removal of particular inorganic or organic molecules from the environment samples. The redox potential is preferably modulated through microbial-mediated oxidation or reduction of metal cations under aerobic or anaerobic conditions, respectively. The invention is further directed to a computer program which facilitates the controlled modulation of the redox potential of an aqueous or semi-aqueous environment or other environments.

US Application US20080047896 describes wastewater treatment systems and methods of treating wastewater. In one exemplary method, a wastewater is split into first and second wastewater fractions. The first fraction is delivered to a membrane bioreactor, which may produce an effluent with a low pollutant concentration, and the second fraction is delivered to a biological wastewater treatment system, which may yield a higher pollution concentration yet have a shorter solids retention time. Some implementations of the invention can routinely meet or even exceed pollution discharge standards quite economically during normal operation, yet retain significant flexibility for handling seasonal or sudden variations in the flow rate of wastewater into the system. In select adaptations, waste activated sludge containing heterotrophs, autotrophs, and (optionally) polyphosphate accumulating organisms is delivered from the membrane bioreactor to the biological wastewater treatment system.

The prior art as stated above suffers from following disadvantages:
- None works without change in configuration of the existing ETP configuration.
- Bio-augmentation process requires strict control of pH, temperature and other parameter with costly controllers.
- Requirement of specific devices for growth of microbial product or their growth and some specific reactors, bioreactors, devices etc for decontamination of wastewater.
- Some products contain single microbes. Considering the complex composition of hydrocarbons, it appears impractical that a single microbe will have capability to remove all types of hydrocarbons. The consortium type approach would be desirable, which is commonly practiced in bioremediation process.
- None is claimed to work effectively in extreme of three seasons i.e., winter, summer, and rainy seasons.
- None of the prior disclosed inventions claims heavy metal tolerance of the microbial blend.

DESCRIPTION OF THE INVENTION

The present invention provides for a bio-augmentation composition for improving the hydrocarbon degradation efficiency of ETP.

It also provides for a synergistic combination of selective microorganisms to develop a consortium/blend enabling effective degradation of hydrocarbons present in wastewater and converting them into harmless and environment friendly substances.

It further provides for a method for stabilization of microbes in aeration tank for improving the hydrocarbon degradation ability.

The bio-augmentation composition used in the invention has following advantages:
- effectively and efficiently degrades hydrocarbons after addition in aeration tank and is not affected by the microbes already present in the activated sludge.
- has environ-tolerant feature to work in seasonal variations,
- has tolerance to have microbial consortium which can detoxify/tolerate heavy metals present in the wastewater.
- the process works without any change in the existing ETP configuration
- the bioaugumentation product has ability to work in shock load.
- does not require any specific device, controllers and additional set up.

According to the present invention, there is provided a microbial consortium which comprises a plurality of individual microorganisms which are particularly Gram-positive spore forming bacteria, wherein the number of individual microorganisms in the consortium is at least five.

The microbial consortium is made up of the following organisms: *Bacillus* Sp., *Bacillus cereus, Lysinibacillus fusiformis, Lysinibacillus* Sp.

According to one embodiment of the invention, the number of individual microorganisms in the consortium is five.

According to the invention, wherein the bacteria are preferably *Bacillus* Species and related microbes.

According to another embodiment of the invention, the microbial consortium comprises of bacteria of five *Bacillus* species with ability to degrade different hydrocarbons and consists of equal ratio of individual microbes. The said microorganisms have tolerance towards commonly occurring contaminants in waste water like cyanide, phenols, benzene, sulfide, ammonia, heavy metals and the like.

According to another embodiment of the invention, there is provided a method of isolation of Gram-positive spore forming bacteria of *Bacillus* Species and related microbes which comprises heat treating of activated sludge obtained from petroleum refinery, streaking on minimal salt agar medium containing 0.5-5% hydrocarbon as carbon source, incubating the same followed by enrichment in presence of suitable nutrient medium that includes a nitrogen source and a phosphorus source along with minor amounts of other conventional nutrients. The nitrogen source is preferably an ammonium salt and the phosphorus source is preferably an alkali metal phosphate compound, wherein the molar ratio of elemental nitrogen to phosphorus is about 5:1 to about 15:1, preferably, from about 8:1 to about 12:1. The nutrient medium includes ammonium chloride, from about 5 to about 20 parts by weight of hydrated magnesium sulphate (MgSO$_4$.7H$_2$O) per 100 parts by weight of ammonium chloride, from about 5 to about 20 parts by weight of sodium chloride per 100 parts by weight of ammonium chloride and from about 15 to about 50, and preferably from about 20 to 30 parts by weight of monobasic potassium phosphate (KH$_2$PO$_4$) per 100 parts by weight of ammonium chloride and traces of vitamins and trace elements.

According to yet another embodiment of the present invention there is provided a method of improving efficiency of treatment of waste water for reduction of hydrocarbons therein comprising:

a) preparing a microbial consortium capable of degrading hydrocarbons in waste water wherein microorganisms in the microbial consortium are adsorbed on a biodegradable carrier, and b) subjecting the microbial consortium to the hydrocarbon contaminated waste water followed by addition of optimized nutrients to promote hydrocarbon degradation.

The microbial consortium is from bacteria particularly spore forming Gram-positive bacteria, wherein the bacteria are *Bacillus* species and related microbes. The said microbes have tolerance to grow in the temperature range 10-50° C. and towards commonly occurring contaminants in refinery waste water like, cyanide, phenols, benzene, sulphide, ammonia, heavy metals and the like. The said microbial consortium comprises five *Bacillus* species with ability to degrade different hydrocarbons and is used in equal ratio to form the microbial consortium. The aromatics content in the hydrocarbons contaminated waste water to be treated is in the range of 05 ppm to 10% by weight, the hydrocarbons are degraded to a final concentration of less than about 05 ppm which is effective in the temperature range of about 10-50° C.

The microbial consortium has a concentration of 0.5 to 10% by weight, preferably from 0.75 to 5% by weight, more preferably from 1% to 2% by volume of wastewater. The nutrients are compounds containing nitrogen, phosphorus, minerals, trace element, vitamins or mixtures thereof and also a mixture of magnesium sulphate, calcium chloride, ammonium nitrate, yeast extract, ferric chloride in equal ratio and final concentration ranging from of 0.001-0.05 g/l. In the present method urea and di-ammonium chloride are added to achieve C:N:P ratio of 1:0.1:0.01 to 100:5:1, preferably 100:1:0.01. The said biodegradable carrier is selected from wheat bran, rice bran, corn residue powder, water hyacinth powder, azola powder or mixture thereof.

According to this invention, the microorganisms capable of degrading hydrorbons are developed by the selective enrichment technique. A suitable nutrient medium for use during the enrichment process includes as stated earlier a nitrogen source, such as an ammonium salt and a phosphorus source, such as an alkali metal phosphate compound. A suitable nutrient system which can be effectively utilized during the enrichment process includes an ammonium salt and a phosphate compound, along with minor amounts of other conventional nutrients, wherein the molar ratio of elemental nitrogen to phosphorus is from about 5:1 to about 15:1, and more preferably from about 8:1 to about 12:1. A particularly preferred nutrient system for use during the enrichment process includes ammonium chloride, from about 5 to about 20 parts by weight of hydrated magnesium sulfate (MgSO$_4$.7H$_2$O) per 100 parts by weight of ammonium chloride, from about 5 to about 20 parts by weight of sodium chloride per 100 parts by weight of ammonium chloride, and from about 15 to about 50, and more preferably from about 20 to about 30 parts by weight of monobasic potassium phosphate (KH$_2$PO$_4$) per 100 parts by weight of ammonium chloride and traces of vitamins and trace elements. The foregoing nutrients are dissolved in a suitable amount of water to dissolve the nutrients and combined with appropriate quantities of a suitable initial primary food source and the mixed bacteria culture. A suitable initial primary food source is generally the total petroleum hydrocarbon obtained from ETP of petroleum refinery. Isolation of the pure desired microorganisms of Gram-positive spore forming bacteria was carried out by heat treatment of the activated sludge obtained from petroleum refinery at 80-100° C. and followed by streaking on minimal salt agar medium containing 0.5-5% hydrocarbon as carbon source. These plates are incubated at 30-50° C. Five microbial strains are obtained at the end of the enrichment cycle employing the aromatic hydrocarbon waste.

The degradation ability of the isolated microrganisms to utilize various hydrocarbons is determined by growing them, separately or in mixture, in mineral media containing one of the test hydrocarbons i.e. crude oil, hexadecane, tretadedecane, phenanthrene and diesel, separately as sole carbon source. Quantitative degradation of hydrocarbon i.e., crude oil, hexadecane, tretadedecane, phenanthrene and diesel, separately, at different concentrations is studied. For that the individual isolate or mixture is inoculated in 5 ml of mineral salt medium. After 48 hr growth the 5 ml culture is transferred into 20 ml fresh medium. After 48 hrs growth 20 ml culture is transferred to minimal salt 80 ml, which contained hydrocarbon obtained from extraction of ETP effluent (1%) as carbon source. All experiments are carried out at 30-40° C. temperature in shaking condition. After incubation of 10 days the residual substrate is measured. The hydrocarbon waste degrading microorganisms showing highest growth and degradation potential have been identified as Gram-positive bacteria. Three microorganisms are mixed in equal ratio to reap the benefits of synergy of their degradation ability and get degradation of total range of the aromatics present in aromatic waste.

The microbial consortium of the present invention are developed based on the growth ability of the isolated bacteria and to take advantage of synergy of microbial metabolism. The five microbes are combined to make the microbial consortium for bioaugumentation and are used in present invention. The degradation potential of the microbial consortium is examined in Shake flask and Modified Strum test (CO$_2$ evolution measurement). The newly developed consortium could reduce more than 96% O&G content in shake flask while the result of Modified Strum test have shown biodegradability of hydrocarbons of ETP water more than 95% using the microbial consortium as inoculum.

After isolation and efficacy tests at laboratory scale the microbial consortium are grown in a bioreactor. An inoculum for bioreactor of the mixed culture of the present invention is prepared by first growing the individual microbe on separate agar plates in a conventional manner. After sufficient growth of the individual microbe is achieved, the microorganisms are transferred to a fresh agar plate for simultaneous growth in a mixed culture. After the mixed culture exhibits successful growth, it is transferred to a bioreactor containing a nutrient solution. The bioreactor preferably contains control devices for temperature, pH, agitation, aeration and stirring. Particularly preferred nutrient system for growth includes (g per liter) KH$_2$PO$_4$ (0.5-1.0), K$_2$HPO$_4$ (0.5-1.0), MgSO$_4$ (0.5-1.0), (NH4)$_2$SO$_4$ (0.25-0.75), KNO$_3$ (0.25-0.75), Trace element (5 ml to 20 ml of solution) and Multi vitamin solution (0.5-5 ml), fermentable sugars as carbon source 1-5%. The trace element solution (gram per liter) comprises Nitrilotriacetic acid (1-1.5), FeSO$_4$.7H$_2$O (0.05-0.15), MnCl$_2$.4H$_2$O (0.005-0.015), CoCl$_2$.6H$_2$O (0.15-0.2), CaCl$_2$.2H$_2$O (0.05-

0.15), $ZnCl_2$ (0.05-0.15), $CuCl_2.H_2O$ (0.01-0.03), $H_3BO_3$ (0.01-0.02), $Na_2MoO_4$ (0.01-0.02), $Na_2SeO_3$ (0.015-0.02), $NiSO_4$ (0.01-0.03), $SnCl_2$ (0.01-0.03). The multivitamin solution (g/1) includes Biotin 0.001-0.003, Folic acid (0.001-0.003), Pyridoxine HCl (0.05-0.02), Thiamine HCl (0.002-0.008), Riboflavin (0.001-0.01), Nicotinic acid (0.002-0.01), Ca-Pentotheonate (0.002-0.01), Lipoic acid (0.0025-0.0075), Vitamin B12 (0.0005-0.0015), PABA (0.0025-0.0075).

The appropriately grown microbial blend is adsorbed on suitable carrier and dispersed in water while being supported on a carrier. The carrier used includes any known material so far as it can be applied to contaminated water, which can firmly adsorb microorganisms to the surface and be helpful in transport and dispersal of final bioremediation agent. Furthermore, the carrier according to the present invention is made of the materials that can retain microorganisms thereon relatively mildly and thus allowing easy release of the microorganisms which have proliferated. In addition, the carrier is inexpensive and acts as a nutrient source for the microorganisms thus applied, particularly a nutrient source, which can be gradually released to advantage. Further, the carrier is a biodegradable material so that any problems arising from secondary contamination by residual carrier or the effect of applied microorganisms on the soil ecological system can be avoided. The biodegradable carrier preferably used according to the invention is a material, which gradually decomposes and disappears after the remediation of soil by the applied microorganisms.

The biodegradable carrier material preferably employed herein in the method includes wheat bran, rice bran, water hyacinth powder, azola powder or any agricultural waste. The water content of the carrier varies from 0.5% to 99.5% by weight, preferably from 4% to 92% by weight, more preferably from 8% to 70% by weight. When the water content of the carrier is too low, microorganisms find difficulty in survival. On the contrary, when the water content of the carrier is too high, the resulting carrier exhibits a deteriorated physical strength that makes itself difficult to handle.

The lab developed microbial consortium were evaluated for their potential to reduce O&G content of wastewater in shake flask. The basic experimental design involves following flask in triplicate:

Control: wastewater to be tested
Non-augmented test: 1% of mixed liquor in wastewater
Nutrient amended test: 1% of mixed liquor in wastewater along with nutrients
Augmented test: 1% of augmented -mixed liquor in wastewater along with nutrients The flask contained 100 ml of wastewater from aeration tank (as such and diluted) and if inoculated, 1% cells (CFU) were added. Nutrients were added to achieve C:N:P ratio of 100:5:1. The flasks were incubated at 35° C. in shaking condition for 72 hrs.

To evaluate the ability of microbial composition to reduce O&G content, standardizing dosing rate, dosing time for stabilization of microbial population the microbial blend was evaluated in a controlled-stir-tank-reactors (bioreactor) of 30 liter capacity containing 20 liter wastewater obtained from aeration tank of oil refinery along with biomass/activated sludge. Water containing different concentration of O&G was examined and in addition to hydrocarbons it also having contaminants like cyanide, phenols, benzene, sulphide, ammonia and heavy metals etc. The bioreactor was amended with urea, di-ammonium phosphate, yeast extract and Bushnell Hass media in a 1:0.4:0.5:0.1 ratios. The bioreactor was bio-augmented with 'lab developed-consortium' (1% of the cells present) consisting of five bacterial strains. All five members were grown individually in 1L Luria broth (LB). An overnight grown culture was harvested by centrifugation and resuspended in 500 ml of BSM. After an incubation period for 24 hrs at 35° C. and 300 rpm, the bacteria were harvested by centrifugation and mixed in equal ratio to prepare "microbial consortium". The microbial consortium was used for bio-augmentation of bioreactor. Reactor was maintained in the continuous mode by supplying waste water collected from a refinery ETP aeration tank and stirred up to 700 rpm. At zero hour sample was withdrawn for measuring the O&G content, and similar samples were withdrawn at every 18 hrs. All samples were drawn in triplicate. For preparation of total DNA samples were collected at zero day and weekly intervals. For estimation of hydrocarbon degrading microbial population sample were collected at zero day and 3-day interval. Microbial consortium as well as nutrients were added as and when required to achieve the optimal microbial load and N:P ratio. The microbial blend was evaluated in different temperature conditions (5-50° C.), heavy metal dosing taking Cr and V (10-2000 ppm) and under different hydrocarbon loading (5 ppm-5%) in a continuous bioreactor.

The following specific examples illustrate the process of this invention, but they should not be constructed as limiting the scope of the invention. Reasonable variations and modifications are possible within the scope of this disclosure without departing from the spirit and scope of this invention.

EXAMPLE 1

Isolation of bacteria capable of degrading high molecular weight PAHs, development of microbial blend and evaluation in liquid media for degradation of highly aromatic sludge.

Microbes were also isolated by using standard enrichment technique from activated sludge from aeration tank of ETP of the refinery. For selective enrichment of spore forming Gram-positive bacteria, inoculum was pre-treated at 80° C. for 30 mins and subsequently, inoculated to nutrient media. The nutrient media (basal salt media, BSM) used for enrichment process includes (grams per liter) 6.0 g of $Na_2HPO_4$, 3.0 g of $KH_2PO_4$, 4.0 g of $NH_4Cl$, 2.5 g yeast extract, 0.1 g of $MgSO_4$ and 2.5 ml of a trace element solution (milligrams per liter), 23 mg of $MnCl_2.2H_2O$, 30 mg of $MnCl_4.H_2O$, 31 mg of $H_3BO_3$, 36 mg of $CoCl_2.6H_2O$, 10 mg of $CuCl_2.2H_2O$, 20 mg of $NiCl_2.6H_2O$, 30 mg of $Na_2MoO_4.2H_2O$ and 50 mg $ZnCl_2$ (pH 7.0). In this media, the waste water ex-physico-chemical treatment from ETP was taken as solvent. Crude oil (2%, weight per volume) was used as carbon source and incubated at 30° C. on a rotary shaker (200 rpm) for three days. After three days 1 ml of the culture was transferred to fresh media containing crude oil (2%; weight per volume) and re-incubated for another three days. Following five cycles of such enrichment, 1 ml of the culture was diluted and plated on BSM agar plates containing the hydrocarbon extracted from wastewater of aeration tank of an oil refinery ETP. The bacterial colonies obtained were further purified, by streaking on Luria-Bertani agar. The ability of the isolates to degrade various hydrocarbon and their mixture (crude oil, hexadecane, tetradecane, phenanthrene and diesel, separately) was determined by growing it, separately, in BSM containing one of the test hydrocarbon/mixture as sole carbon source. The isolated microbes were tested for their ability to grow in ex-physico-chemical treatment i.e., before biological treatment waste water and different concentration of heavy metals like Cr, Vanadium, lead and copper.

Based on the growth ability of the isolated bacteria five bacterial strains were selected and to take advantage of synergy of microbial metabolism, microbial consortium/blend were developed. These bacterial strains were identified by 16SrRNA partial gene sequencing and biochemical assays. The microbial blend for bioremediation and evaluated in shake flask for their ability to degrade different pure and complex hydrocarbons and reduce hydrocarbon content of wastewater. Beside carbon, microbes require nitrogen, phosphorus and trace elements for their growth. For this different inorganic/organic salts/compounds are added to the wastewater to achieve optimum growth of bacteria. Studies were conducted to standardize the optimum nutrient mixture for growth of introduced bacteria.

Beside carbon, microbes require nitrogen, phosphorus and trace elements for their growth. For this different inorganic/organic salts/compounds are added to the wastewater to achieve optimum growth of bacteria. Experimentation was conducted to standardize the optimum nutrient mixture for growth of introduced bacteria. Based on the experimentation mixture of magnesium sulphate, calcium chloride, ammonium nitrate, yeast extract, ferric chloride in equal ratio and 0.01 g/l were found optimum. Urea and di-ammonium chloride to achieve C:N:P ratio of 100:5:1.

An inoculum of the mixed culture of the present invention was prepared by first growing the individual microbe on separate Luria agar plates in a conventional manner. After sufficient growth of the individual microbe is achieved, all three microbes were transferred to a fresh agar plate for simultaneous growth of all organisms together in a mixed culture. After the mixed culture exhibits successful growth, it can be transferred to a suitable vessel containing a nutrient solution. The vessel preferably should contain control devices for temperature, pH, agitation, aeration and stirring. The temperature was kept 30 degree C., stirring 500 rpm and air 2 L/min. Used nutrient system for growth includes (gram per liter) $KH_2PO_4$ 0.1.5-2.0, $K_2HPO_4$ 1.5-2.0, $MgSO_4$ 1.0-2.0, $(NH_4)_2SO_4$ 2.0-4.0, $KNO_3$, 1-2, Trace element 22 ml to 32 ml of solution and Multi vitamin solution 3-7 ml, 8-10% glucose as carbon source. The composition of trace element solution (gram per liter) is Nitrilotriacetic acid 1-1.5, $FeSO_4.7H_2O$, 0.05-0.15, $MnCl_2.4H_2O$ 0.005-0.015, $CoCl_2.6H_2O$ 0.15-0.2, $CaCl_2.2H_2O$ 0.05-0.15, $ZnCl_2$ 0.05-0.15, $CuCl_2.H_2O$ 0.01-0.03, $H_3BO_3$ 0.01-0.02, $Na_2MoO_4$ 0.01-0.02, $Na_2SeO_3$ 0.015-0.02, $NiSO_4$ 0.01-0.03, $SnCl_2$ 0.01-0.03. The composition of trace element solution multi-vitamin solution (gram per liter) is Biotin 0.001-0.003, Folic acid 0.001-0.003, Pyridoxine HCl 0.05-0.02, Thiamine HCl 0.002-0.008, Riboflavin 0.001-0.01, Nicotinic acid 0.002-0.01, Ca-Pentotheonate 0.002-0.01, Lipoic acid 0.0025-0.0075, Vitamin $B_{12}$ 0.0005-0.0015, PABA 0.0025-0.0075. The appropriately grown mixed microbial culture of the invention was adsorbed on previously UV sterilized corn floor in ratio 1:6 (volume per weight). This material was packed in UV sterilized plastic bag keeping 40-60% space for air and it was sealed.

The laboratory developed microbial consortium along with optimized nutrients was evaluated for its potential to reduce O&G content of wastewater in shake flask. The basic experimental design involves following flask in triplicate:
  Control: wastewater to be tested
  Non-augmented test: 1% of mixed liquor in wastewater
  Nutrient amended test: 1% of mixed liquor in wastewater along with nutrients
  Augmented test: 1% of augmented -mixed liquor in wastewater along with nutrients The flask contained 1000 ml of wastewater from aeration tank and if inoculated, 1% cells (CFU) were added. Urea and di-ammonium chloride were added to achieve C:N:P ratio of 100:5:1. The flasks were incubated at 35° C. in shaking condition for 36 hr. Table-1 shows the hydrocarbon degradation.

TABLE 1

Hydrocarbon degradation by microbial consortium

| S. No. | Test system | % degradation in 36 hr |
|---|---|---|
| 1 | Control | 05 |
| 2 | Non-augmented test | 48 |
| 3 | Nutrient amended test | 58 |
| 4 | Augmented test along with nutrient | 96 |

EXAMPLE 2

Evaluation of the Microbial Preparation in Bioreactor

The microbial blend was evaluated in a bioreactor of 7 liter capacity containing 5 liter wastewater along with biomass/activated sludge. The bioreactor was amended with nutrient mixture, urea, di-ammonium phosphate with C:N:P in 1:4:0.5:0.1 ratios. The bioreactor was bio-augmented with 'microbial consortium' (1% of the cells present) consists of five bacterial strains. Reactor was maintained in the continuous mode and 700 rpm. The bioreactor is continuously feeded with untreated wastewater in the manner that after every 18 hrs the total content of the bioreactor replaced.

At zero hour sample was withdrawn for measuring the O&G content, and similar samples were withdrawn at every 18 hrs. All samples were drawn in triplicate. Enumeration of hydrocarbon-degrading microbial populations was conducted using a specific Most-Probable-Number (MPN) protocol. This technique used to separately enumerate microorganisms capable of degrading aliphatic hydrocarbons and polycyclic aromatic hydrocarbons (PAHs).

Figure 1:
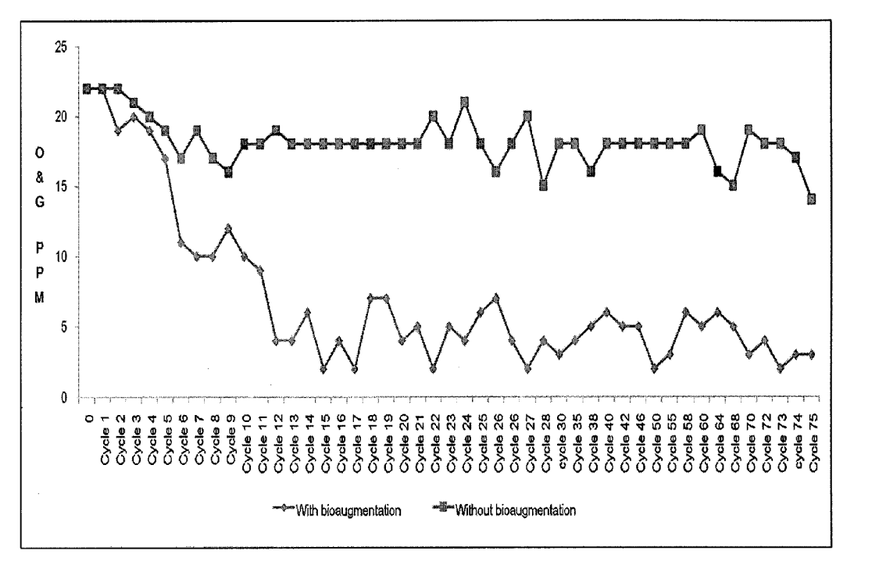

The results are shown in accompanying FIG. 1. As can be seen from the figure, there was very less effect of bio-augmentation until one week. Thereafter, the rate of decrease in O&G, or the increase in catabolic potential of the bio-augmented reactor was higher than in nutrient control reactor. The MPN test indicates increase in the various group of hydrocarbon degrader population after one week. However, the microbial count and O&G content was still not found stable. Based on MPN data, weekly inoculation for four week and nutrient addition was carried out for four weeks. This leads to stabilization of hydrocarbon degrading population as indicated by constant decrease in O&G content and microbial count. The results indicated that bio-augmentation has greatly enhanced the efficiency of the reactor.

FIG. 1: Time dependent reduction in O&G content in bioreactor. A: Initial loading 20 ppm O&G RAPD was performed of the total DNA prepared from the biomass in the bioreactor from samples withdrawn every week. The RAPD profile of both reactors is similar to large extent. This was not unexpected, since the source of biomass is the same in both reactors. However, the bio-augmented bioreactor shows the presence of thicker bands after second week when compared to the bioreactor which contained only nutrients. RAPD profiles of the consortium members do not correspond to the reactor samples suggesting that the addition of the 5-member consortium enhances the microbial community present in the sample, which has led to the improved efficiency of the biomass with respect to degradation. The RAPD profile also suggests the stabilization of the microbial community after the 2nd week. The thicker bands in the 2nd week sample of control suggest the presence of an active population.

The changes in population of hydrocarbon degrading microbes were studied by MPN method using a 96 well microtiter plate. The results showed that weekly inoculation and nutrient addition for four week resulted in gradual increase in different hydrocarbon degrading microbes and stabilization of their population. Results also indicates that however there was increase in hydrocarbon degrading bacteria with time, however, the total number of bacteria were same in bio-augmented as well as nutrient control and other. The study demonstrates the efficiency of bio-augmentation. Results show the higher decrease in O&G content when the system is bio-augmented.

The isolated and characterized bacteria of the microbial consortium as described hereinbefore have been deposited at the Microbial Type Culture Collection and Gene Bank (MTCC), Sector-39A, Chandigarh-160 036, India, an International Depository Authority (IDA) in India, on 4 Oct. 2011. These micro-organisms can be identified by their Accession numbers issued by the IDA as MTCC 5662 for *Bacillus* sp. GP-ETPBA1, MTCC 5663 for *Bacillus cereus* GP-ETPBA2; MTCC 5664 for *Lysinibacillus fusiformis* GP-ETPBA3; MTCC 5665 for *Bacillus cereus* GP-ETPBA4 and MTCC 5666 for *Lysinibacillus* sp. GP-ETPBA5.

We claim:

1. A formulated microbial consortium comprising combination of *Bacillus* sp. GP-ETPBA1 (MTCC 5662), *Bacillus cereus* GP-ETPBA2 (MTCC 5663); *Lysinibacillus fusiformis* GP-ETPBA3 (MTCC 5664); *Bacillus cereus* GP-ETPBA4 (MTCC 5665) and *Lysinibacillus* sp. GP-ETPBA5 (MTCC 5666) in equal proportions which has synergistic effect in improving the efficiency of treatment of waste water in plants for removal of contaminants at temperature range from 10 to 50° C. when hydrocarbons present in contaminated waste water in the range of 5 ppm to 5% by weight and heavy metals are present in the range of 10-2000 ppm.

2. The microbial consortium as claimed in claim 1, wherein the bacterial consortium is a spore forming Gram-positive bacteria.

3. The microbial consortium as claimed in claim 1, wherein microbial consortium has tolerance towards contaminants in waste water like cyanide, phenols, benzene, sulfide and ammonia.

4. A method of isolation of spore forming Gram-positive bacteria species as claimed in claim 1 comprising the steps of:
   heat treating of activated sludge obtained from petroleum refinery;
   streaking on minimal salt agar medium containing 0.5-5% hydrocarbon as carbon source; and
   incubating the same followed by enrichment in presence of suitable nutrient medium.

5. The method as claimed in claim 4, wherein the nutrient medium comprises a nitrogen source and a phosphorus source along with other conventional nutrients.

6. The method as claimed in claim 4, wherein the nutrient medium comprises ammonium chloride, from about 5 to about 20 parts by weight of hydrated magnesium sulphate ($MgSO_4.7H_2O$) per 100 parts by weight of ammonium chloride, from about 5 to about 20 parts by weight of sodium chloride per 100 parts by weight of ammonium chloride and from about 15 to about 50, and preferably from about 20 to 30 parts by weight of monobasic potassium phosphate ($KH_2PO_4$) per 100 parts by weight of ammonium chloride and traces of vitamins and trace elements.

7. A method of improving efficiency of treatment of waste water using microbial consortia as claimed in claim 1 for reduction of hydrocarbons therein comprising:
   preparing a microbial consortium capable of degrading hydrocarbons in waste water, wherein microorganisms in the microbial consortium are adsorbed on a biodegradable carrier, and
   subjecting the microbial consortium to the hydrocarbon-contaminated waste water followed by addition of optimized nutrients to promote hydrocarbon degradation.

8. The method as claimed in claim 7, wherein the microbial consortium is from bacteria particularly spore forming Gram-positive bacteria.

9. The method as claimed in claim 7, wherein the microorganisms have tolerance to grow in the temperature range 10-50° C. and towards commonly occurring contaminants in refinery waste water, like cyanide, phenols, benzene, sulphide, ammonia and heavy metals.

10. The method as claimed in claim 7, wherein the microorganisms are five Bacillus species with ability to degrade different hydrocarbons and are used in equal ratio to form the microbial consortium.

11. The method as claimed in claim 7, wherein the hydrocarbons are degraded to a final concentration of less than about 5 ppm.

12. The method as claimed in claim 7, wherein the microbial consortium has a concentration of 0.5 to 10% by weight.

13. The method as claimed in claim 7, wherein the nutrients used are compounds containing nitrogen, phosphorus, mineral, trace element, vitamins or mixtures thereof.

14. The method as claimed in claim 7, wherein the nutrients used is a mixture of magnesium sulphate, calcium chloride, ammonium nitrate, yeast extract, ferric chloride in equal ratio and final concentration ranging from of 0.001-0.05 g/l.

15. The method as claimed in claim 7, wherein urea and di-ammonium chloride are added to nutrient to achieve C:N:P ratio of 1:0.1:0.01 to 100:5:1.

16. A method as claimed in claim 7, wherein the biodegradable carrier is selected from, wheat bran, rice bran, corn residue powder, water hyacinth powder, azola powder or a mixture thereof.

17. The method as claimed in claim 12, wherein the microbial consortium has a concentration from 0.75 to 5% by weight of wastewater.

18. The method as claimed in claim 12, wherein the microbial consortium has a concentration from 1% to 2% by volume of wastewater.

19. The method as claimed in claim 15, wherein urea and di-ammonium chloride are added to nutrient to achieve C:N:P ratio of 100:1:0.01.

* * * * *